Oct. 21, 1930.                    C. E. VAWTER                    1,779,347
                              INDICATING BOND TESTER
                               Filed Jan. 7, 1922
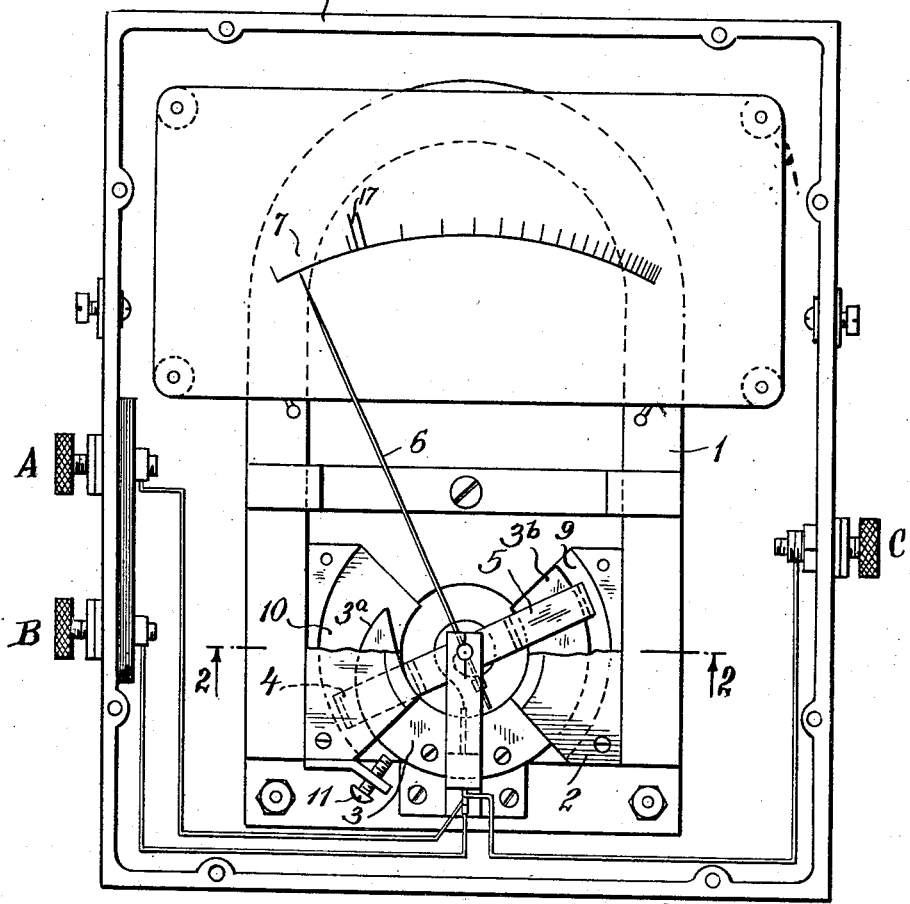
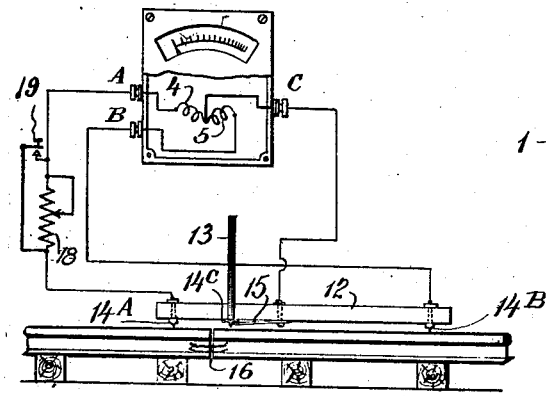
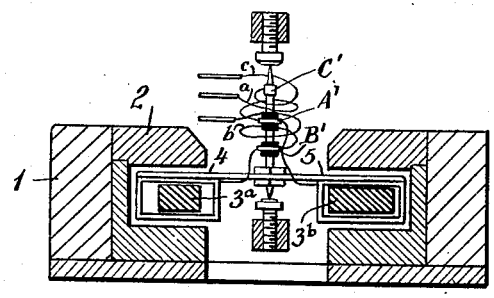
INVENTOR
Charles E. Vawter
BY
Pennie, Davis, Marvin & Edmonds
ATTORNEYS Patented Oct. 21, 1930

1,779,347

UNITED STATES PATENT OFFICE

CHARLES E. VAWTER, OF PHILADELPHIA, PENNSYLVANIA, ASSIGNOR TO WESTON ELECTRICAL INSTRUMENT CORPORATION, OF NEWARK, NEW JERSEY, A CORPORATION OF NEW JERSEY

INDICATING BOND TESTER

Application filed January 7, 1922. Serial No. 527,706.

The present invention relates to an indicating rail bond tester, and has to do particularly with apparatus for indicating directly the resistance of a rail bond in terms of a fixed length of rail.

Due to the fact that tracks on which rail bonds are being tested are usually in use and are carrying current, it is impossible to measure the resistance of the bond by passing a direct current of known value between the ends of the adjacent rails and measuring the corresponding values of the currents and of potential drop across the bond. Consequently a testing instrument whose own measuring current is furnished by a battery or similar source cannot be used due to the fact that the current already flowing in the rail would render the readings of the instrument useless. Furthermore, the magnitude of the current already flowing in the rail is invariably unknown so that it is impossible to compute the readings of the bond by merely reading the potential drop across it. As a result, the testing of such rail bonds is commonly accomplished by comparing in some manner the potential drop across the bond with the potential drop along a fixed length of solid rail.

As a method of testing current carrying rail bonds it has been proposed to take a reading of the potential drop across the rail bond and simultaneously take a reading of the voltage drop which occurs over a given length of unbroken rail, the measurements being taken by two millivoltmeters or with the aid of a special low resistance bridge. It is evident that from this data, giving the ratio of potential drops over the rail bond and over a given length of unbroken rail, that by a proper calculation the resistance of the rail bond can be expressed in feet of unbroken rail.

It is a principal object of the invention to provide an indicating rail bond tester which may be easily and conveniently applied to the rail and which will indicate directly the electrical resistance of the rail bond expressed in terms of a given length of unbroken rail.

It is a further object to provide an indicating bond tester of the above type which will give accurate readings of the resistance of the rail bond, even though small currents are flowing in the rail, and which will give accurate indications regardless of fluctuations in the current traversing the rail.

It is also an object to provide an instrument of this type having a non-uniform scale, the lower portion of the scale range being sensitive, so that small resistances may be accurately read, and the upper portion of the scale being of a more extensive range.

It is a still further object to provide an instrument of this type which, upon application to the rail, will initially indicate whether the potential drop along the rail is sufficient to produce an accurate indication upon the instrument of the resistance of the bond.

I have illustrated a preferred embodiment of my invention in the accompanying drawings; in which Figure 1 is a plan view of the indicating instrument employed in my improved rail bond testing apparatus; Fig. 2 is a transverse sectional view taken on line 2—2 of Fig. 1; and Fig. 3 is a view, largely diagrammatic, showing the electrical connections employed in my improved bond tester.

The indicating instrument employed in connection with my rail bond testing apparatus is an ohmmeter instrument of substantially the same construction as the instrument disclosed in my co-pending application, Serial No. 527,705, filed Jan. 7, 1922, and comprises essentially a horseshoe magnet 1 provided with specially shaped pole pieces 2 for furnishing the magnetic field of the instrument, a specially shaped magnetic core 3 positioned intermediate between the poles of the magnet, and a movable element comprising the coils 4 and 5 surrounding, respectively, the two arms $3^a$ and $3^b$ of the magnetic core. The movable coil element also carries an indicating pointer 6 which moves along a suitable scale 7 and affords an indication of the various positions assumed by the movable element. The parts of the instrument are preferably enclosed within a box or casing 8 which may be of iron or other magnetic material for shielding the instrument parts from stray magnetic fields.

As set forth in the above mentioned copending application, and also in Patent No. 1,426,619, granted to me on August 22, 1922, the character of the scale according to which the indicating pointer 6 will move is determined by the shape of the arms $3^a$ and $3^b$ of the magnetic core. That is, by properly shaping this core the instrument may have a scale of any desired type. In the present instance it is to be noted that the arm $3^b$ of the core continues with full cross section to its extremity, the inner and outer edges of the core being concentric circles whose center is coincident with the axis of rotation of the movable element. With this construction the air gap 9 occurring between the arm $3^b$ of the core and the adjacent pole piece of the magnet is uniform throughout its entire extent and consequently the magnetic flux traversing the gap will be substantially uniform throughout. On the other hand, the arm $3^a$ of the core is materially shorter than the arm $3^b$, and furthermore is abruptly tapered toward its end. This construction produces an air gap 10 between the arm $3^b$ and the adjacent pole piece which increases in width toward the tip of the arm $3^a$, and which will consequently be traversed by magnetic flux whose density decreases abruptly toward the tip of the arm.

When the moving element of the instrument is in the position shown with the indicating pointer 6 near the lower end of the scale, the coil 4 lies in a portion of the air gap in which the magnetic flux density is relatively high. Accordingly, a given change in current through the coil will cause a relatively large displacement of the movable element about its axis, and the lower portion of the scale range will be correspondingly sensitive. As the moving element rotates farther in a clockwise direction, the coil 4 moves into a magnetic field of decreased density due to the tapering of the core arm $3^a$, while coil 5 continues to move in a field of substantially constant density. In such position a given change in current through the coil 4 will produce but a relatively slight displacement of the movable element, and the scale divisions along the upper portion of the range must be placed correspondingly close together. This type of construction adapts the instrument for indicating accurately resistance magnitudes which cause the pointer 6 to come to rest on the lower portion of the scale range. If the resistance is relatively high it is not desired to ascertain its exact value inasmuch as it is obviously too high for economical use, and the bond must in any case be repaired. However, if the resistance of the bond is low it is desired to ascertain its value accurately for use in computing the total resistance of the line. In such case the indicating pointer of the instrument will come to rest along the lower portion of the scale range and the value of the resistance may be easily and accurately read directly from the instrument scale.

In manufacturing ohmmeter instruments, I have found that with apparently identical treatment the magnets are often somewhat different in strength and the distribution of magnetism along the metal of the magnet varies materially in different specimens. By means of the flux adjusting screw 11 these variations in magnet strength and distribution of magnetism may be compensated for and all instruments may be equipped with identical scales, adjusting screw 11 being used to bring the indicating pointer into proper registration with the scale markings after the instrument is completely assembled. If this screw be moved in close to the magnetic core 3 it is seen that the air gap at that point is materially reduced and consequently a larger amount of flux will pass from the pole piece to the core by way of the screw 11. In this sense the screw serves as a shunt path for a portion of the magnetic flux and affords a means for changing the character of the scale to a certain extent. It is further to be noted that this adjustment may be easily and conveniently made by merely removing the cover of the instrument and setting the screw 11 to the desired position. When once properly adjusted, however, the screw 11 is normally left in its adjusted position without further attention.

A further advantage of the flux adjusting member 11 lies in the fact that it permits the parts of the instrument to be prepared and assembled without particular attention being paid to the accurate machining and mounting of the various parts. After the instrument is completely assembled and equipped with a scale 7 of predetermined character the movement of the pointer 6 may be caused to correspond to the markings on the scale by merely applying the instrument to a known resistance and bringing the pointer to the correct position by adjusting the screw 11. I have indicated one of such flux adjusting members, but it is evident that other such members may equally well be applied to the other arm of the horseshoe magnet or to the opposite ends of the pole pieces 2 without changing the character of the instrument.

In Fig. 3 I have illustrated the electrical connection of the indicating instrument together with a preferred method of making contact with the rail. The adjacent ends of the coils 4 and 5 are connected together and are attached to the binding post C provided on the outside of the instrument casing. The other ends of the coils 4 and 5 are connected respectively to binding posts A and B of the instrument. These connections to the movable coil element may be made through contacts C', A' and B', respectively, provided on the vertical shaft of the movable element as shown in Fig. 2, and connected to the stationary parts of the instrument through light trailers *c*, *a* and *b*, preferably of gold or silver, which exert substantially no torque on the moving element of the instrument.

I preferably effect the connection of the indicating instrument to the rail by means of a contact bar 12 which may be provided with a handle 13 for convenience in placing it upon the rail. Near the ends of the bar are placed contacts 14A and 14B connected, respectively, to the binding posts A and B of the instrument. Adjacent one of these contacts is provided a third contact 14C connected to binding post C and which may be conveniently mounted upon the lower end of the handle 13, the handle being mounted to slide vertically in the bar 12 so that it may be depressed into contact with the rail. A spring 15 is supplied to normally hold the contact 14C out of engagement with the rail.

When the apparatus is applied to the testing of a rail bond the binding posts A, B and C of the indicating instrument are connected to the contacts of the bar 12, as shown, and the bar is placed upon the track so that the interval between the contacts 14A and 14C will span the rail joint 16 and the interval between contacts 14C and 14B will span a fixed length of unbroken rail. Immediately upon placing the contact bar upon the track a potential difference will be created between contacts 14A and 14B if there is current flowing in the rail, and such potential difference will cause a current to traverse coils 4 and 5 in series. Since the currents in each of the coils are equal, the movable element of the instrument will seek a position of balance at a point which indicates that the ratio of the currents in the coils is unity. I preferably provide the scale with a pair of heavy lines 17, as shown, to indicate the narrow zone in which the indicating pointer 6 will come to rest when the instrument is initially applied to the rail if sufficient current be flowing in the rail for a measurement to be taken. Should the pointer not come immediately into this position when the instrument is applied to the rail the operator will be informed that there is not sufficient current flowing in the rail to effect a test.

The contact 14C may then be lowered by pressing the handle 13, in which case the coil 4 will be subjected to an electrical potential equal to the voltage drop across the rail joint due to the current flowing in the rail, and the coil 5 will be subjected to a potential equal to the voltage drop along the length of unbroken rail between contacts 14C and 14B. Accordingly a current will traverse coil 4 which is proportional to the resistance of the rail bond, and a current proportional to the resistance of the fixed length of unbroken rail will traverse the coil 5. Inasmuch as the indication of the instrument is in proportion to the ratio of these two currents it is evident that the scale may be conveniently calibrated to indicate the resistance of the rail bond in terms of a length of unbroken rail. For instance, the scale may be calibrated to indicate directly the number of feet of unbroken rail containing a resistance equal to that of the rail bond under test. In case only a small current is present in the rail, such as is the case on steam roads where the rail carries only the current used for signalling purposes, it may be desirable to provide a few dry cells to furnish the desired measuring current. The instrument is, however, adapted to give accurate indications when only a small current is present in the rail due to the particular construction of the pole pieces, which are formed to surround a substantial portion of the periphery of the coil and cause the greater part of the coil winding to be actively traversed by the magnetic lines of force. Thus, a given current through the coil will produce a torque much greater than would be obtained if only one side of the coil lay in the gap between the core and the magnet pole.

For the purpose of protecting the instrument in case of an excessively high potential drop across the rail bond and for the further purpose of permitting resistances of higher value to be indicated upon the scale, I provide a resistance coil 18 in circuit with the instrument preferably between the binding post A and the contact 14A. This resistance may be of any desired value. A key 19 may conveniently be provided for the purpose of short circuiting the resistance 18 in case it is desired to subject the indicating instrument directly to the potential of the rail. In the use of the instrument equipped with the resistance 18, the bar 12 is placed in contact with the rail in the usual manner, the key 19 being left in open position. A swinging of the pointer into proximity with the line 17 on the scale will indicate that sufficient current in flowing to effect a test, after which the contact 14C may be lowered on to the rail. In case an excessive potential drop exists across the bond the needle of the instrument will swing abruptly to the higher values on the scale, but will be protected by the resistance 18 which is in circuit with the coil 4. If, however, the needle remains on the lower portion of the scale, the key 19 may be safely closed and a reading of the resistance of the bond taken in the ordinary manner.

In the embodiment of the invention described the current through the instrument is produced solely by the potential drop along the rail due to current flowing in the rail, but it is evident that measurements may be taken upon rails which are not carrying current by supplying an external source of electro-motive force, such as a few dry cells and connecting them to the rail at points outside the fixed contacts 14A and 14B. The current from the dry cells will flow across the rail bond and through the length of solid rail spanned by the contacts 14B and 14C and will thus produce an indication on the instrument in the same manner as though a current were flowing throughout the entire length of the track. It is further evident that other changes, such as the form of contact bar employed, the exact character of the instrument scale, the position of the balance point, and the like, may be varied without departing from the spirit of the invention. If desired, the arm 3ª of the magnetic core need not be of constant thickness as has been described, but may be reduced in thickness towards its end for the purpose of securing proper distribution of the flux in conjunction with the tapering in a lateral direction. Furthermore, it would be possible to secure a satisfactory scale even though both arms were tapered. Further changes may be made within the full scope of the appended claim.

It is also to be noted that one or more adjusting screws 11 may be used as desired. I have illustrated only one such screw in the drawings, but the other pole of the magnet may be likewise provided with an adjusting screw 11, and, if desired, additional screws may be placed in proximity to the tips of the core arms 3ª and 3ᵇ for the purpose of affording adjustments of great accuracy. In a rail bond tester of this type accurate readings are desired only along the lower part of the scale range, and I have found that satisfactory results are obtained by providing one adjusting screw 11 as shown, and by means of this single screw bringing the indicating pointer 6 into proper registration with some one point along the lower part of the scale range. For instance, a current may be sent through the two coils 4 and 5 in series, as would be the case in actual use when the middle contact 14C of the contact bar 12 is raised, and if the instrument is in correct adjustment the indicating pointer will lie between the heavy lines 17 marked on the scale. In case the pointer does not assume this position, it may readily be adjusted by merely changing the position of the screw 11. When accurately set for registration at this point on the scale the indicating pointer will coincide with all points throughout the lower part of the scale range with substantial accuracy.

I claim:

In a rail bond testing apparatus of the class described, the combination with a contact bar comprising a pair of fixed contacts and a third contact intermediate between the fixed contacts and adjacent one of them for spanning the rail bond being tested, a fixed length of unbroken rail lying between the intermediate contact and the other of said fixed contacts, and means for adjusting said intermediate contact toward and away from the rail, of an indicating instrument having two serially connected coils, an indicating member actuated in response to the ratio of the currents traversing said coils, a scale associated with said indicating member and having marked thereon a zone within which said indicating member will come to rest when current sufficient to actuate said instrument traverses said coils in series, electrical connections between the outer ends of said coils and the respective fixed contacts, and an electrical connection between the junction of said coils and said third contact, whereby said coils may be first connected in series and subjected to the potential difference along the length of rail spanned by said fixed contacts, and may be subsequently subjected independently to the respective potential drops occurring between each fixed contact and the intermediate contact by the lowering of the movable contact into engagement with the rail.

In testimony whereof I affix my signature.

CHARLES E. VAWTER.